United States Patent [19]

Bauer

[11] Patent Number: 5,501,414

[45] Date of Patent: Mar. 26, 1996

[54] STRUCTURE HAVING AN AERODYNAMIC SURFACE FOR AN AIRCRAFT

[75] Inventor: Richard Bauer, Hamburg, Germany

[73] Assignee: Deutsche Aerospace Airbus GmbH, Hamburg, Germany

[21] Appl. No.: 240,827

[22] Filed: May 11, 1994

[30] Foreign Application Priority Data

May 11, 1993 [DE] Germany .......................... 43 15 600.2

[51] Int. Cl.$^6$ ................................ B64C 1/06; B64C 3/18; B64C 3/26
[52] U.S. Cl. ........................... 244/124; 244/123; 416/233
[58] Field of Search ..................................... 244/123, 124, 244/131; 416/227 R, 233, 236 R

[56] References Cited

U.S. PATENT DOCUMENTS

| Re. 21,850 | 7/1941 | Thomson | 244/124 |
|---|---|---|---|
| 1,335,527 | 3/1920 | Plym | 244/123 |
| 1,801,202 | 4/1931 | Krummel | 244/124 |
| 2,330,185 | 9/1943 | Palmer | 244/123 |
| 2,372,510 | 3/1945 | Mitchell et al. | 244/123 |
| 2,543,709 | 2/1951 | Saulnier | 244/124 |
| 2,567,124 | 9/1951 | Roberts | 244/124 |
| 2,997,262 | 8/1961 | Kirk et al. | 244/123 |
| 3,002,717 | 10/1961 | Pavlecka | 244/124 |
| 3,096,958 | 7/1963 | Koontz | 244/123 |
| 3,185,267 | 5/1965 | Pavlecka | 244/123 |
| 3,647,318 | 3/1972 | Pehrsson et al. | 416/233 |
| 4,356,616 | 11/1982 | Scott | 244/123 |
| 4,667,905 | 5/1987 | Hamm | 244/123 |

FOREIGN PATENT DOCUMENTS

| 126834 | 6/1945 | Australia | 244/123 |
|---|---|---|---|
| 702278 | 12/1929 | France | 244/123 |
| 54480 | 3/1945 | France | 416/233 |

OTHER PUBLICATIONS

Airframe Structural Design by M. Chun–Yung Niu, p. 368 1988.
NAS 1919, 4 pages Blindniete, Apr. 1972.
MS21141, 3 pages, Dec. 1990.

*Primary Examiner*—Andres Kashnikow
*Assistant Examiner*—Virna Lissi Mojica
*Attorney, Agent, or Firm*—W. G. Fasse; W. F. Fasse

[57] ABSTRACT

An aerodynamic structure having an aerodynamic surface for an aircraft, has at least two spars, several ribs made up of rib elements, and two shells made up of a plurality of shell elements. The ribs extend in the direction of the profile depth of the structure and the longitudinal extension of the spars and shells corresponds approximately to the span width of the structure. The shells and ribs are subdivided in the direction of the profile depth with an approximately equal division, to form at least two structural components open along one length side and closed by a spar along the opposite length side. Each component (21, 22) has two shell elements (24, 25; 34, 35, etc.) and several rib elements (26a, 26b; 36a, 36b), and one spar (5 to 9), wherein with the help of the open sides and shoulders along the sides closed by the respective spar, one structural component (21, 22) can be so nested within the other structural component that a following structural component (21, 22) fits partly into a preceding structural component. Thus, rivet connections can be made even if the structure is thin and has a large profile depth.

7 Claims, 7 Drawing Sheets

STRUCTURE HAVING AN AERODYNAMIC SURFACE FOR AN AIRCRAFT

FIELD OF THE INVENTION

The invention relates to a structure having an aerodynamic surface for an aircraft, such as a wing or tail assembly for an aircraft. These aircraft structures are bodies provided with surfaces shaped with due regard to aerodynamic requirements.

BACKGROUND INFORMATION

When an aircraft wing, for example, is constructed as a so-called monocoque structure, the wing box comprises an upper shell or skin, a lower shell or skin, a leading edge spar, a trailing edge spar, and ribs. The shells or skins comprise wing skin sections extending in the direction of the wing span. These shells are stiffened by longitudinal stringers or spars extending in the wing span direction and by ribs extending substantially perpendicularly to the wing span direction. The spars are in principle flat structural components while the shells or skins have a three-dimensionally curved configuration in accordance with the aerodynamic profile of an aircraft wing. The ribs arranged inside the wing box extend from spar to spar and are connected along their long edges with the skin or shells. The connection between the spars and the ribs or between the shells and the spars and ribs are conventionally formed by all purpose rivets or by threaded rivets having a set head and a closure head, whereby the closure head is formed on the inside of the structure by a swage tool or by screwing the rivets into the structure. These rivets permit the production of cost efficient connections having consistently reproducible static characteristics.

In order to achieve a structure surface that is as smooth as possible, it is customary to primarily use countersunk rivets. If the structure has a sufficient profile thickness and a relatively small profile depth of the wing or tail unit, then there are no problems in the assembly of the shells with the ribs and spars, because the accessibility required for the rivet setting swage tool to the rivet location from the inside is provided by respective handholes or manholes. In other words, proper accessibility is provided as long as the wing thickness measured vertically and perpendicularly to the wing span, is sufficient for the tool insertion even if the wing depth or profile depth measured horizontally is relatively small. These considerations apply equally to wings and components of the tail assembly. However, problems occur if a wing box or tail unit box has only a small profile thickness while simultaneously having a relatively large profile depth, as is for example the case for aircraft capable of supersonic speeds. In such instances the accessibility for the riveting operation is very limited so that the attachment of the skin sections to the spars and ribs becomes very difficult. The substantial use of blind rivets does not provide a solution to the problem, because the type of blind rivets that may be used for the intended purpose have two critical disadvantages. First, if special rivets are used, they are too expensive. Second, general purpose rivets, though less expensive, are limited in their use by government regulation.

Another method for producing an aerodynamic structure having a very small profile thickness, for example for an elevator assembly, is described in a book by Michael C. Y. Niu entitled "Air Frame Structural Design", published by Technical Book Company, 1991, Los Angeles, page 368. FIGS. 10.2.8 or 10.2.10(a) in this publication show a tail assembly in the form of a so-called flying tail. In principle, a flying tail comprises two shells sandwiching a honeycomb core therebetween having the profile or configuration of a fin or flap. The shells forming the outer skin are secured to the honeycomb core by adhesive bonding. This type of construction of a very thin aerodynamic surface or rather body in principle does not require any riveting work so that the inner space of the fin or flap does not need to be accessible during production. This fact is a manufacturing advantage which, however, must be compared to the disadvantage that in operation the structure such as a fin is exposed to the normal loads and to additional loads caused by the closed construction. Such additional loads occur due to differences between the pressure inside the structural component and the pressure outside the structural component. This differential pressure can cause leaks so that condensation water may form inside of the honeycomb core, whereby in turn the adhesive bonding connections may be damaged.

Since the present structure shall be successfully usable at supersonic speeds, the structure must have a sufficient fatigue strength due to the expected dynamic loads. In connection with aerodynamic surfaces intended for use at supersonic speeds, it is further very important that the aerodynamically ascertained profile thicknesses must be met with a very high accuracy during manufacture.

OBJECTS OF THE INVENTION

In view of the above it is the aim of the invention to achieve the following objects singly or in combination:

to construct an aerodynamic structure for supporting an aerodynamic shell of the type mentioned above in such a manner that the shell can be secured to a frame or support structure without any problems, even if the structure has a small profile thickness and a relatively large profile depth;

to avoid the use of a honeycomb core structure in such aerodynamic structures as wings, tail assemblies, fins, flaps, and the like;

to divide such aerodynamic structures into sections in such a way that each section has an open side that permits access to all riveting locations and so that after riveting is completed the sections can be partly nested one in the other;

to produce the individual sections of aluminum sheet metal, aluminum alloy sheet metal, light metal alloys of aluminum and lithium, or of fiber reinforced composite materials; and to make sure that the present aerodynamic bodies have a sufficient fatigue strength and a precise dimensional stability of the profile thickness even if that "thickness" is rather thin.

SUMMARY OF THE INVENTION

The above objects have been achieved according to the invention by the combination of the following features in an aerodynamic structure for an aircraft. Such a structure comprises at least two spars, several ribs or rib elements, and two shells, one on each side, each shell including several shell elements, whereby the ribs extend in the direction of the profile depth of the structure. The shells and ribs are divided in the direction of the profile depth into several structural components each including shell elements, rib elements, and at least one spar and so that these structural components have approximately the same divisional dimension. The structural components are so constructed that they can be nested relative to each other whereby a following structural component is inserted into a preceding structural component. The term structural component in this context refers to a structure that comprises several structural elements, namely as two shell elements, a plurality of rib elements and at least one spar. The spars and shell elements have a length that corresponds approximately to the span width of the structural component. The rib elements in each structural component comprise at least two rib halves connected to each other, and the shell elements are constructed as integral structural components. Preferably an integral shell element comprises a skin and a plurality of inwardly facing stringers forming an integral part of the skin. Such integral shell elements are formed for example by a machining or milling operation or by an extrusion process.

The structure according to the invention has the advantage that it can be produced without any problems even if the aerodynamic body has a small profile thickness and a relatively large profile depth with the added advantage that a honeycomb core is avoided. By dividing each rib element into two rib halves, it becomes possible to construct the components with a high accuracy in their profile thickness, because each rib half can now be riveted to its shell section before the shell sections with their rib halves secured thereto are riveted to each other in an assembly jig that holds the structural component halves precisely together.

The construction according to the invention is suitable for all materials customarily used in aircraft construction. For example, the shell sections, spars, and ribs can be manufactured of aluminum sheet metal, light metal alloys of, for example, aluminum and of lithium. However, these elements can also be made of fiber reinforced synthetic material, whereby a fiber composite material reinforced by carbon fibers is of special interest. The above mentioned integral construction of the shells with the skin and stringers forming an integral element has the advantage that the required structural strength is achieved even if the profile thickness is small enough for aircraft structures intended for supersonic speeds.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
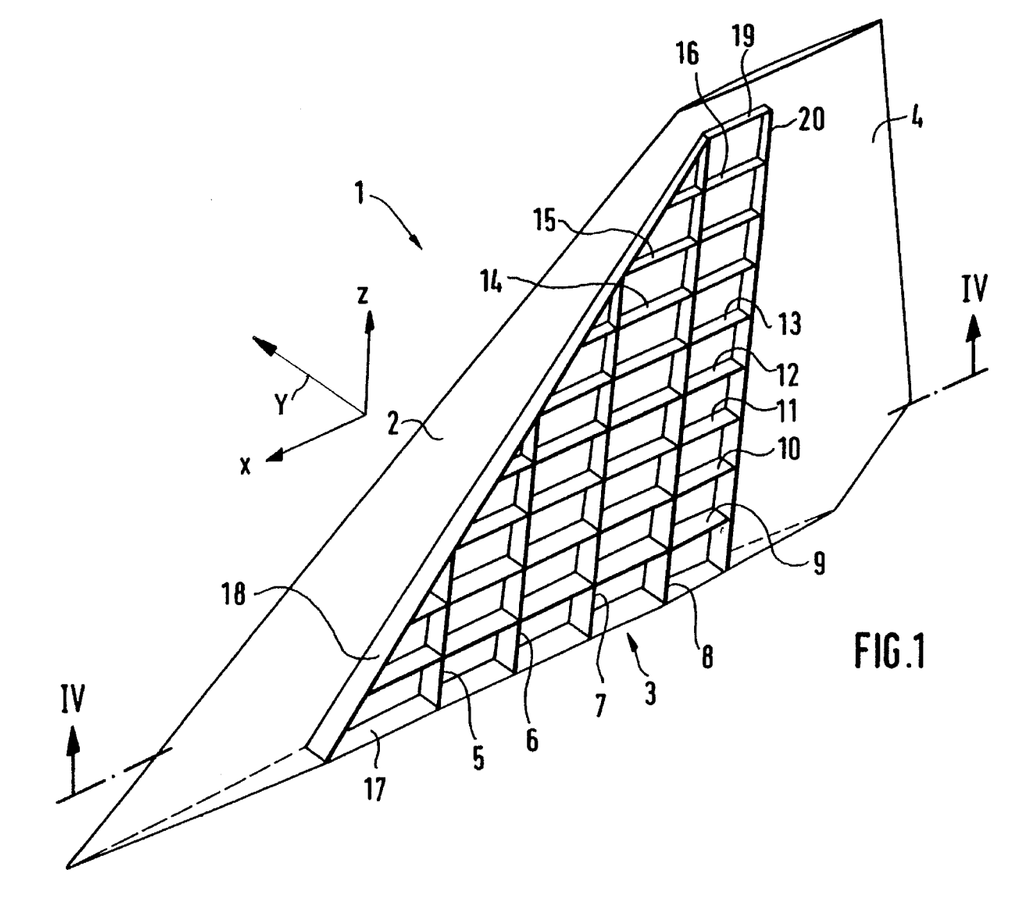
FIG. 1 is a perspective view of a structure forming an aircraft rudder assembly according to the invention, wherein the facing cover shell has been removed to make the frame structure visible.

FIG. 1 shows schematically a rudder assembly 1 for an aircraft. The rudder assembly has a leading edge 2, a supporting frame structure 3, and a rudder 4, whereby, for orientation, the coordinate system x, y, z is fixed in the airplane, specifically the x direction represents the roll axis, the z direction represents the yaw axis, and the y direction represents the pitching axis. The skin or shell section facing the viewer has been removed from the frame structure 3 so that the spars 5, 6, 7 and 8 and the ribs 9, 10, 11, 12, 13, 14, 15 and 16 are visible. The spars extend in parallel to each other and substantially vertically. The ribs extend in parallel to each other and substantially horizontally. Thus, the spars and ribs intersect each other at an angle of approximately 90°. The spars are through-going while the ribs are formed by individual rib elements which in turn are divided into rib element halves to be described below.

The support frame structure 3 is bounded in the downward direction by a connector rib 17, in the forward direction by a slanted lead spar 18, in the upward direction by a last rib or end rib 19, and in the backward direction by a rear spar 20. The frame structure 3 has a small profile thickness in the y direction, however a relatively large profile depth in the x direction. Therefore special measures are necessary in order to facilitate the production of the frame structure 3. Thus, according to the invention it is provided that the shells and ribs are divided in the x direction, more specifically in the x-z-plane, so that each divisional section or structural component has approximately the same divisional dimension in the direction of the profile depth, namely in the x direction. The division results from the formation of a plurality of shell elements and rib elements. These elements are then assembled in a jig to form the frame structure 3 of several structural components, each comprising one spar, two shell or skin elements, and several rib elements. The so formed structural components are constructed with protruding shell elements forming an open gap along one longitudinal side, and with a step 45 along the opposite longitudinal side, so that one component can be nested within the other component by inserting a following structural component into a preceding structural component. The so formed structural components practically constitute longitudinal, strip shaped structural groups of rib elements, skin elements, and at least one spar in each component, and such structural groups are then assembled with other similar structural groups to form the structure covered by the skin elements.

Figure 2A:
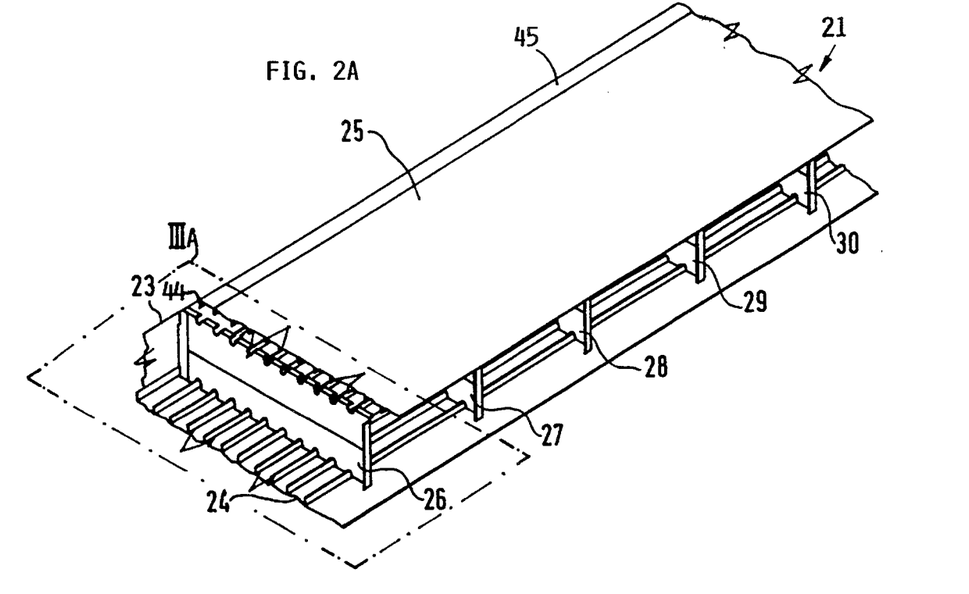
FIGS. 2A and 2B show perspective views of two structural components according to the invention ready for assembly to each other by partly nesting one component into the other component.
Figure 2B:
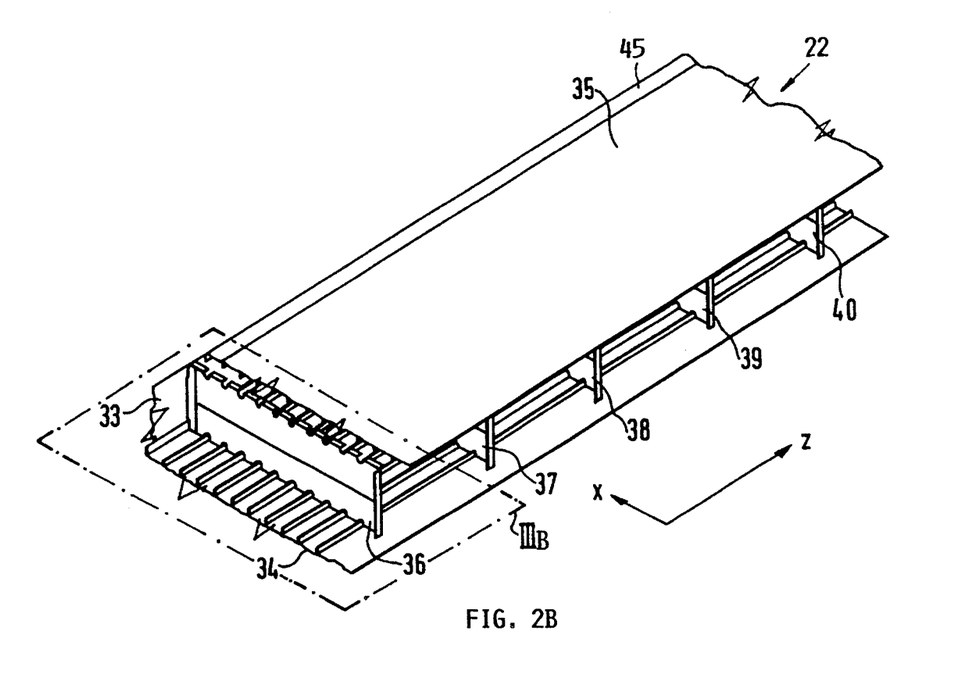

FIGS. 2A and 2B show schematically and with a perspective view, two structural components 21 and 22 each comprising several structural elements as outlined above. Each of these components 21 and 22 is preassembled and constitutes a structural group ready for assembly with other structural groups. Thus, the structural group or component 22 will be connected to the component 21 as will be described below.

The structural component 21 substantially comprises one spar 23, shell elements 24 and 25 which together with the spar 23 form a section that has a U-sectional configuration or profile. The structural component also comprises, for example, five rib elements 26, 27, 28, 29 and 30 which are connected to the shell elements 24 and 25 so that the space enclosed between the shell elements 24 and 25 is subdivided into several spaces having a parallelepiped shape. However, each rib element is divided into two rib element halves, each of which is first riveted to its respective shell element 24 or 25. The so formed structural component 21 is closed along one side by the spar 23. The steps 45 are formed in the shell elements 24, 25 along the spar 23. However, the side opposite of the spar 23 is open and hence easily accessible for the formation of all the rivet connections required for pre-assembling the structural component 21. Most rivet connections can be formed as finished rivet connections substantially without any blind rivets. The connections here involved comprise the connections of the shell elements 24 and 25 with the spar 23 and with the ribs 26 to 30. All the finished rivet connections comprise general use rivets or screw rivets which can be set in a conventional manner. Merely the connections between the spar 23 and the rib elements 26 to 30 will be formed at a later point of time as will be described below.

The structural component 22 is constructed in the same way comprising a spar 33, shell elements 34, 35 and rib elements 36, 37, 38, 39 and 40. In all structural components 21, 22 and so forth, the spars 23, 33 are not yet connected with the rib elements. These connections are made when two structural components are assembled with each other as will be described below.

Figure 3A:
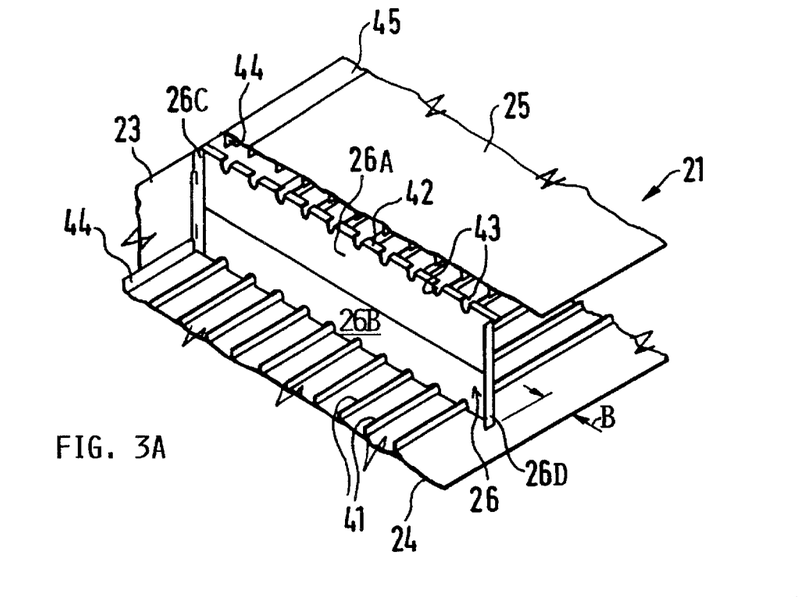
FIG. 3A shows on an enlarged scale, a perspective view of the detail IIIA in FIG. 2A.
Figure 3B:
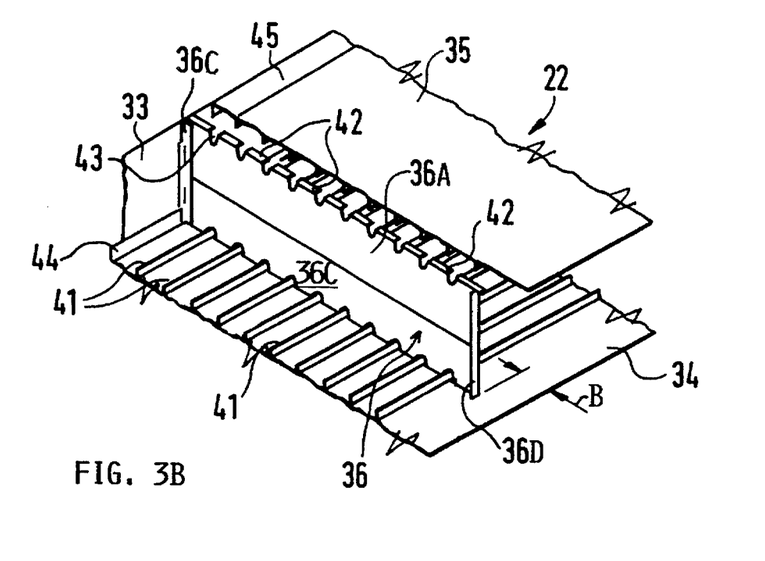
FIG. 3B shows on an enlarged scale a perspective view of the detail IIIB in FIG. 2B.

FIG. 2A is viewed in conjunction with FIG. 3A, while FIG. 2B is viewed in conjunction with FIG. 3B, whereby in FIG. 3A only the rib element 26 of the structural component 21 is shown while FIG. 3B only shows the rib element 36 of the structural component 22. Referring first to structural component 21, the skin or shell elements 24 and 25 are stiffened according to the invention by inwardly extending stringers 41 forming integral parts of the shell elements which are formed as described above by machining or extrusion. The stringers 41 extend substantially in parallel to the spar 23. The rib element 26 comprises along its edges facing the shell elements 24 and 25 a plurality of rivet flanges 42 which conform with their surface to the surface of the respective shell element 24, 25. Grooves 43 are provided between neighboring rivet flanges 42 to accommodate the stringers 41 in these grooves 43. The rib element 26 comprises two rib halves 26A and 26B which are riveted to each other in a preparatory separate operation. An L-section 26C is riveted to the far end of the rib halves 26A, 26B for securing the spar 23 to the far end of the rib halves 26A, 26B by respective rivets. The L-section 26C is connected to the rib element 26 with a finished riveting in such a way that the not yet riveted leg of the L-profile extends with its plane in parallel to the plane of the spar 23 without any stress. A further L-section 26D is riveted to the near end of the rib halves 26A and 26B of the rib element 26 for securing the respective leg of the L-section 26D to the spar 33 when the two structural components 21 and 22 are secured to each other.

For connecting the spar 23 with the shell elements 24 and 25, these shell elements are provided along their longitudinal edges with spar chords 44 which are so oriented that they rest in parallel against the plane of the spar 23 so that both elements can be connected to each other by rivets. In the area of the spar 23 and the spar 33 each shell element 24, 25, 34, 35 is provided with the above mentioned step 45 for the nesting as described. The depth of the step or rather of its riser corresponds to the thickness of the respective shell element 24 or 25, while its width perpendicularly to the spar 23, 33 and parallel to the ribs corresponds to a certain overlap B shown in FIGS. 3A and 3B. This overlap B is provided along the open side of each structural component 21, 22 by dimensioning the respective shell elements 24, 25, 34, 35 longer than the rib elements so that to the extent permitted by the overlap B, the structural component 22 may be nested or pushed into the structural component 21 and the spar 33 can be riveted to the legs or flanges 26D.

The structural component 22 is constructed in the same manner as described above for the structural component 21. The shell elements 34 and 35 form together with the spar 33 and the rib elements 36, 37, 38, 39 and 40 the structural component 22. The rib element 36 also comprises two half ribs 36A and 36B. All ribs are divided in this manner. The respective L-sections 36C and 36D are secured to the respective rib ends by riveting. The structural component 22 also comprises stringers 41, rivet flanges 42, and grooves 43 in the ribs through which the stringers 41 pass. Further, spar chords 44 and steps 45 are as well provided as described for the nesting.

In order to assemble several structural components 21, 22, and so forth with each other, these structural components are nested one into the next so that the following structural component 22 is pushed into the preceding structural component 21. Thus, the structural component is inserted with its spar 33 facing toward the component 21 to the extent permitted by the free edges B of shell sections of the component 21 until the spar 33 rests against the legs of the L-section 26D to 30D connected to the respective ribs.

In assembling the structural components 21, 22 attention must be paid to a proper alignment of the components relative to each other in the longitudinal direction, namely in the z direction of the plane x-z coordinates shown in FIG. 2B. The alignment must be such that each rib element 36 to 40 of the structural component 22 is aligned with the respective rib element 26 to 30 of the structural component 21. As a result all ribs are oriented in the x direction of the just mentioned plane x-z coordinates. In the illustrated example, the legs of the L-sections 26D and 36D and so forth face each other across the spar 33 without any displacement in the z direction. Once the two components 21, 22 are aligned as just described and held in a jig in a fixed positioned, the rivet holes are then drilled and general purpose rivets are set. The overlap B along the step 45 is so dimensioned that several rows of rivets may be set in parallel to each other. In the area of the L-sections 26D, 36C, the respective rivet connections are made to the respective spar by high performance blind rivets. Such blind rivets are, for example, manufactured in accordance with Standard NAS 1919 in case conventional aluminum or lightweight metal alloy sheet metal components are used. When fiber reinforced composite materials are used, blind rivets made according to standard MS 21141 are recommended.

The required accessibility for the riveting operations is assured, due to the fact that each following structural component 22, and so forth has an open side. All rivet positions are accessible from the open side by a respectively constructed riveting robot for assembling the frame structure and only a few rivets need to be blind rivets.

Figure 4:
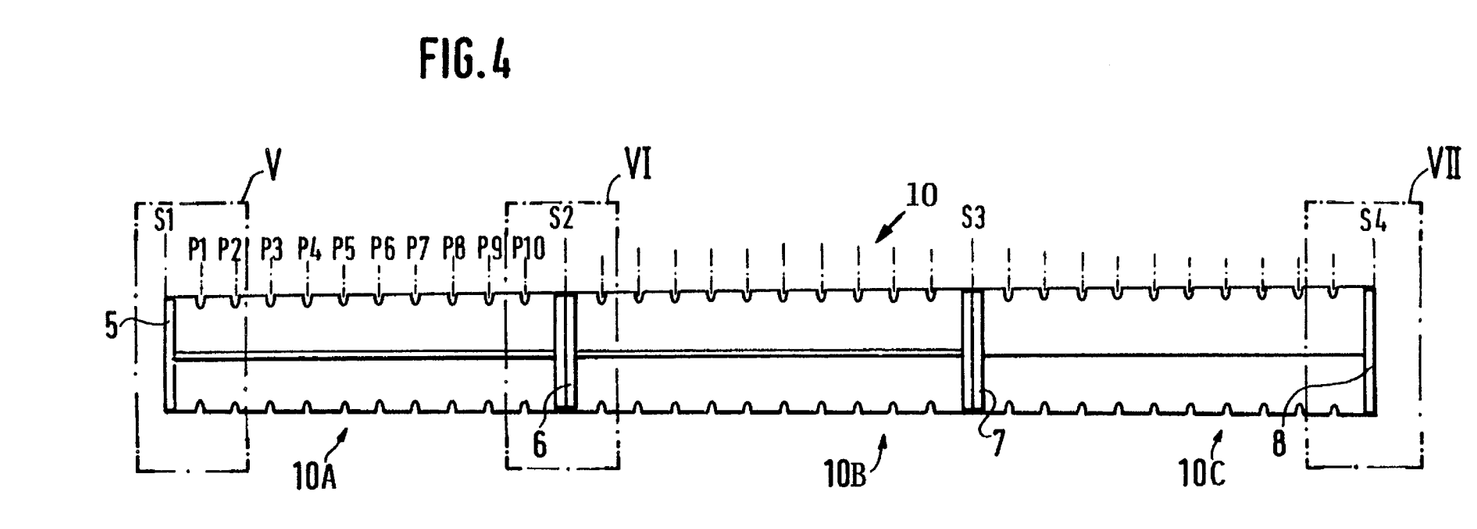
FIG. 4 is a sectional view along section line IV—IV in FIG. 1.

FIG. 4 shows a sectional view along section line IV—IV in FIG. 1, wherein the spars 5, 6, 7 and 8 are shown in cross-section. The rib 10 is shown in the plane of the drawing and comprises rib elements 10A, 10B and 10C. Each rib element is in turn divided into two rib element halves 10D, 10E, . . . .

Figure 5:
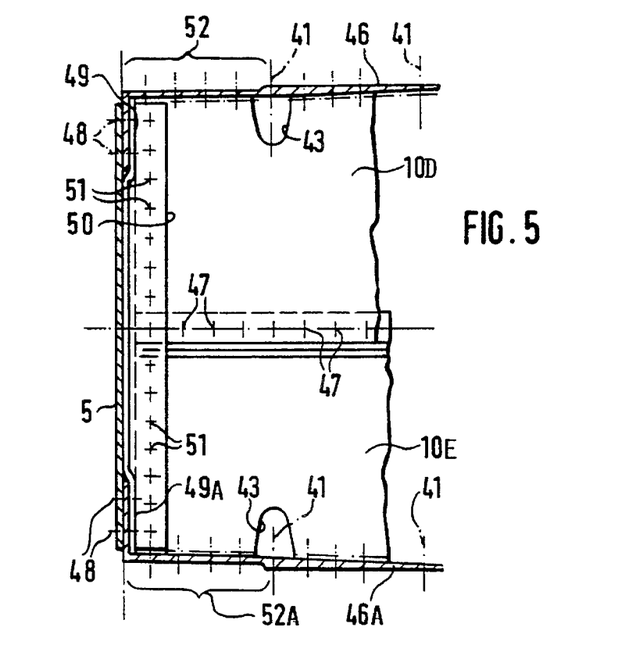
FIG. 5 shows, on an enlarged scale the detail V in FIG. 4.

FIG. 5 shows the detail V of FIG. 4 on an enlarged scale illustrating the spar 5 extending perpendicularly to the plane of the drawing and riveted to the rib element halves 10D and 10E forming part of the rib element 10A and illustrating the cut-outs or grooves 43 through which the stringers 41 extend. The rib halves 10D and 10E are interconnected with each other by rivets 47. The spar chords 49 and 49A of the shell elements 46 and 46A are connected by rivets 48 to the spar 5. The L-section 50 is connected by rivets 51 to the rib halves 10D and 10E. The shoulders or steps 52, 52A of the outer surfaces correspond to the thickness of the respective preceding shell element 46 and 46A.

Figure 6:
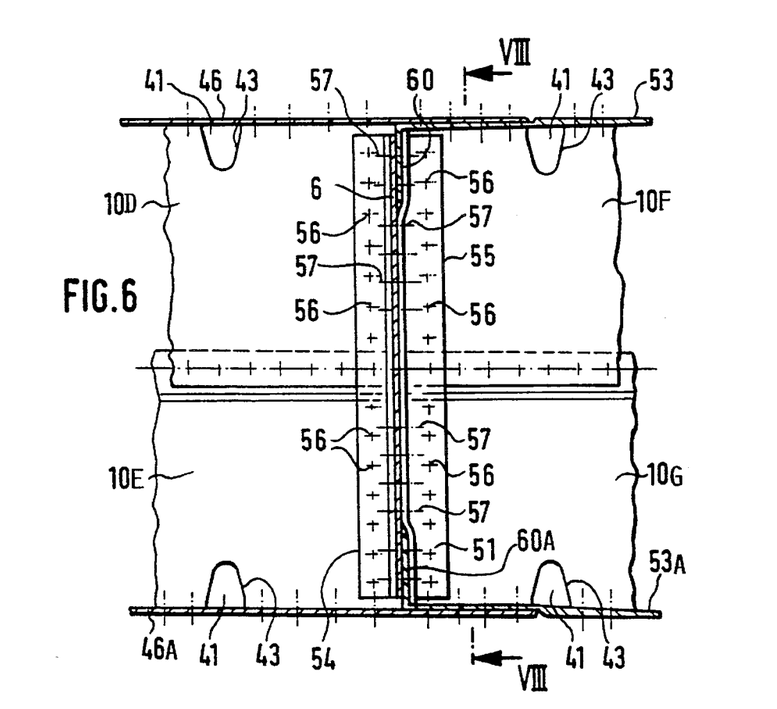
FIG. 6 shows on an enlarged scale the detail VI in FIG. 4.

FIG. 6 shows the detail VI in FIG. 4 on an enlarged scale. The preceding structural component comprises the rib halves 10D and 10E of the rib element 10A as well as the shell elements 46 and 46A and the L-section 54. The next following structural component comprises the spar 6, the shell elements 53 and 53A, the rib half sections 10F and 10G and the L-section 55. The structural component comprising the just mentioned elements is inserted with its shoulder or step 45 into the preceding structural component in such a way that the spar 6 rests against the leg of the L-section 54 and so that the shouldered shell elements 53 and 53A overlap with the projecting margins or edges of the shell elements 46, 46A. Rows of rivets are set in the overlapping shoulder or step area to form the required connection. The L-sections 54 and 55 are connected with the rib half sections 10D to 10G by rivets 56. The spar 6 is connected to the two L-sections 54, 55 by blind rivets 57. The setting heads of which are positioned to the right of the spar 6 in the illustration of FIG. 6. This is the accessible side of the spar 6 during the riveting operation.

The dimensional accuracy is maintained during the above mentioned assembly work especially with regard to the profile thickness by performing the following sequence. First, two shell elements are placed in a jig with the required spacing from each other, whereby the spacing plus twice the shell thickness corresponds to the profile thickness from skin surface to skin surface. The rib element halves may be riveted to the respective shell element prior to mounting the shell elements in the jigs or the rib element halves may be riveted to the respective shell element in the jig not shown. In the next step the shell elements rigidly held in the jig are riveted to the respective spar. In the next step the rib halves are riveted to each other.

Figure 7:
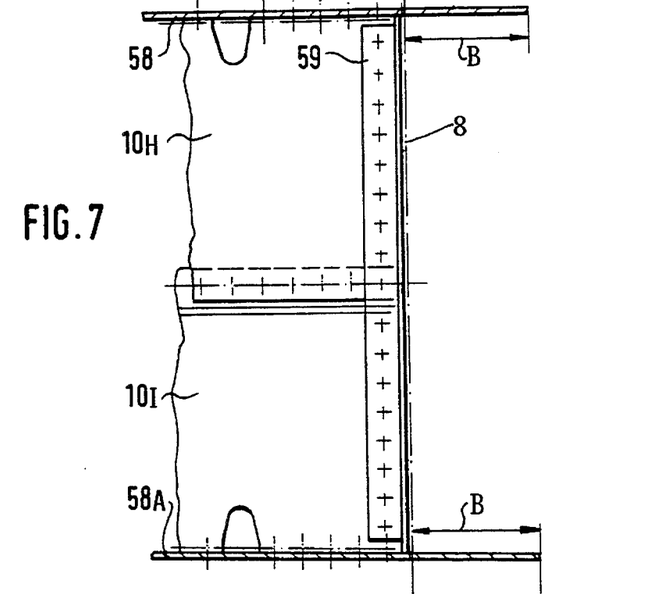
FIG. 7 shows on an enlarged scale the detail VII in FIG. 4.

FIG. 7 shows an end section of the structural component including the rib element 10C shown in FIG. 4. The rib element 10C comprises rib halves 10H and 10I to which the shell elements 58 and 58A are riveted. The respective L-section 59 connects the rib halves 10H and 10I to the spar 8. The next following structural component is inserted between the projecting margins of the shell elements 58, 58A. The projecting margins have a width B as mentioned above, and the next structural component is inserted to the depth of width B until the next element contacts the spar 8 which in turn is connected to the L-section 59.

Figure 8:
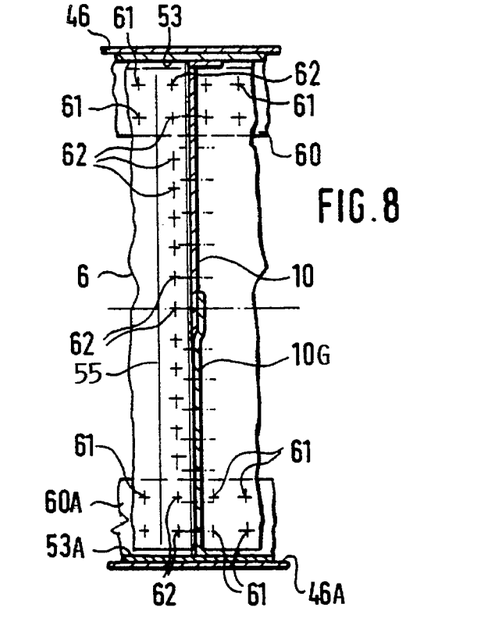
FIG. 8 shows a sectional view along section line VIII—VIII in FIG. 6.

FIG. 8 shows the section VIII—VIII in FIG. 6, illustrating the spar 6, the rib halves 10F and 10G and the shell elements 46 and 46A as well as the shouldered areas of the shell elements 53 and 53A with the riveting chords 60 and 60A provided with rows of rivets 61. Blind rivets 62 connect the L-section 55 with the spar 6 and with the further L-section 54 positioned behind the spar 6. The set heads of the blind rivets 62 are shown facing the viewer.

In the just described embodiments the spars and ribs intersect each other at an angle of approximately 90° so that the respective boxes have an approximately rectangular base area. As shown, however, in FIG. 1, due to the slanted position of the lead spar 18, box areas with a triangular or with a trapezoidal configuration may be formed. The structural embodiment of respective connections between slanted spars and ribs does not pose any problems since respectively angled sections may be used in the corners for the rivet connections.

Figure 9:
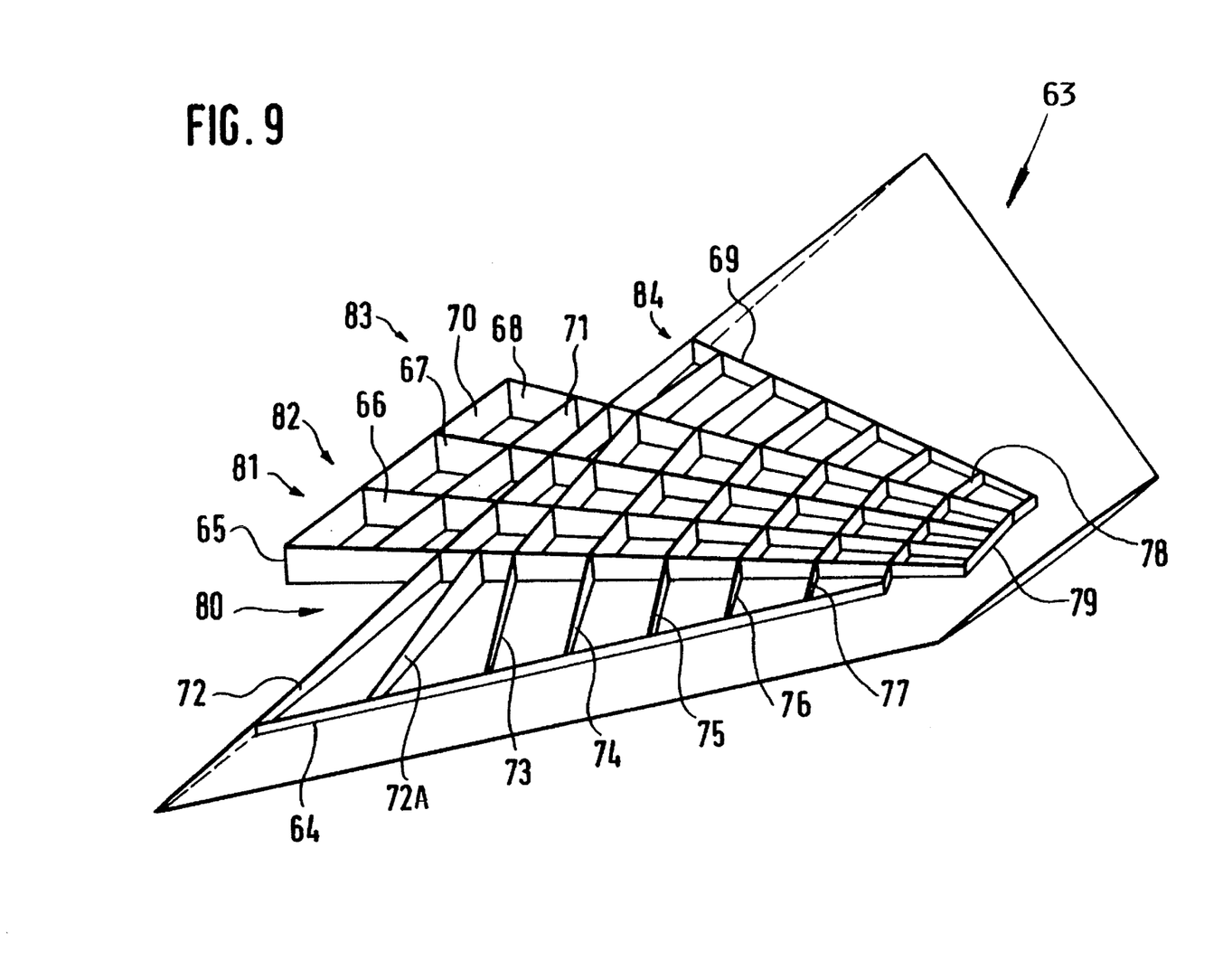
FIG. 9 shows a perspective view of a structure for an aircraft elevator assembly according to the invention.

FIG. 9 shows schematically a perspective view of an aircraft elevator assembly 63 having a small profile thickness in the z direction and a substantial profile depth in the x direction of the coordinates of FIG. 1. The elevator assembly 63 is formed by the spars 64, 65, 66, 67, 68, and 69 and by the ribs 70, 71, 72, 73, 74, 75, 76, 78, and 79. The facing shell element is not shown in FIG. 9 to facilitate the illustration. The construction again employs the box construction according to the invention. First the structural components 80 to 84 are preassembled, and then boxed or nested as described above. In the shown elevator assembly the spars 64 to 69 converge toward the end rib 79. The centrally positioned rib sections between the spars 65, 66, 67, and 68 follow substantially straight line portions which together follow part of a polygonal line. The rib sections outside the just mentioned spars are arranged at an angle to the centrally positioned rib sections. Further, ribs 70, 71 and 72A show that the length and number of the rib elements of one structural component 80 to 84 is independent of the length and number of rib elements of the neighboring structural component 80 to 84.

Although the invention has been described with reference to specific example embodiments, it will be appreciated that it is intended to cover all modifications and equivalents within the scope of the appended claims.

What is claimed is:

1. A structure having an aerodynamic surface for an aircraft, comprising at least two structural components including at least two spars, a plurality of ribs including rib elements, and two shells, whereby the ribs extend in the direction of a profile depth of the structure, and wherein said shells and said ribs are divided in the direction of said profile depth with an approximately equal division into a plurality of shell elements and rib elements, wherein said structural components are so nested one in the other that a following structural component is partly inserted into a preceding structural component; wherein each structural component comprises one spar, two shell elements and several rib elements; wherein the length of the spars and of the shells corresponds approximately to a span width of the structure; wherein each of the rib elements comprises two rib halves connected to each other; and the shell elements are constructed as integral structural parts.

2. The structure of claim 1, wherein said spars have a convergent orientation toward an end of said structure.

3. The structure of claim 1, wherein said rib elements (73 to 79) are arranged along a line forming part of a polygon.

4. The structure of claim 1, wherein the length and the number of the rib elements in one structural component (80 to 84) are independent of the length and number of rib elements of the respective preceding structural component (80 to 84).

5. The structure of claim 1, wherein said integral structural shell parts comprise a skin and a plurality of stringers integral with said skin.

6. The structure of claim 5, wherein said ribs comprise grooves through which said stringers extend.

7. The structure of claim 5, wherein said stringers extend substantially in parallel to said spar and perpendicularly to said ribs.

\* \* \* \* \*

UNITED STATES PATENT AND TRADEMARK OFFICE
CERTIFICATE OF CORRECTION

PATENT NO. : 5,501,414
DATED : March 26, 1996
INVENTOR(S) : Bauer

It is certified that error appears in the above-identified patent and that said Letters Patent is hereby corrected as shown below: On the title page:

In [56] References Cited

U.S. PATENT DOCUMENTS: add the following:

--4,715,560    12/87    Loyek........244/123
      4,776,534    10/88    Bamford......244/123--.

Signed and Sealed this

Twenty-fifth Day of June, 1996

Attest:

BRUCE LEHMAN

*Attesting Officer*    *Commissioner of Patents and Trademarks*